UNITED STATES PATENT OFFICE.

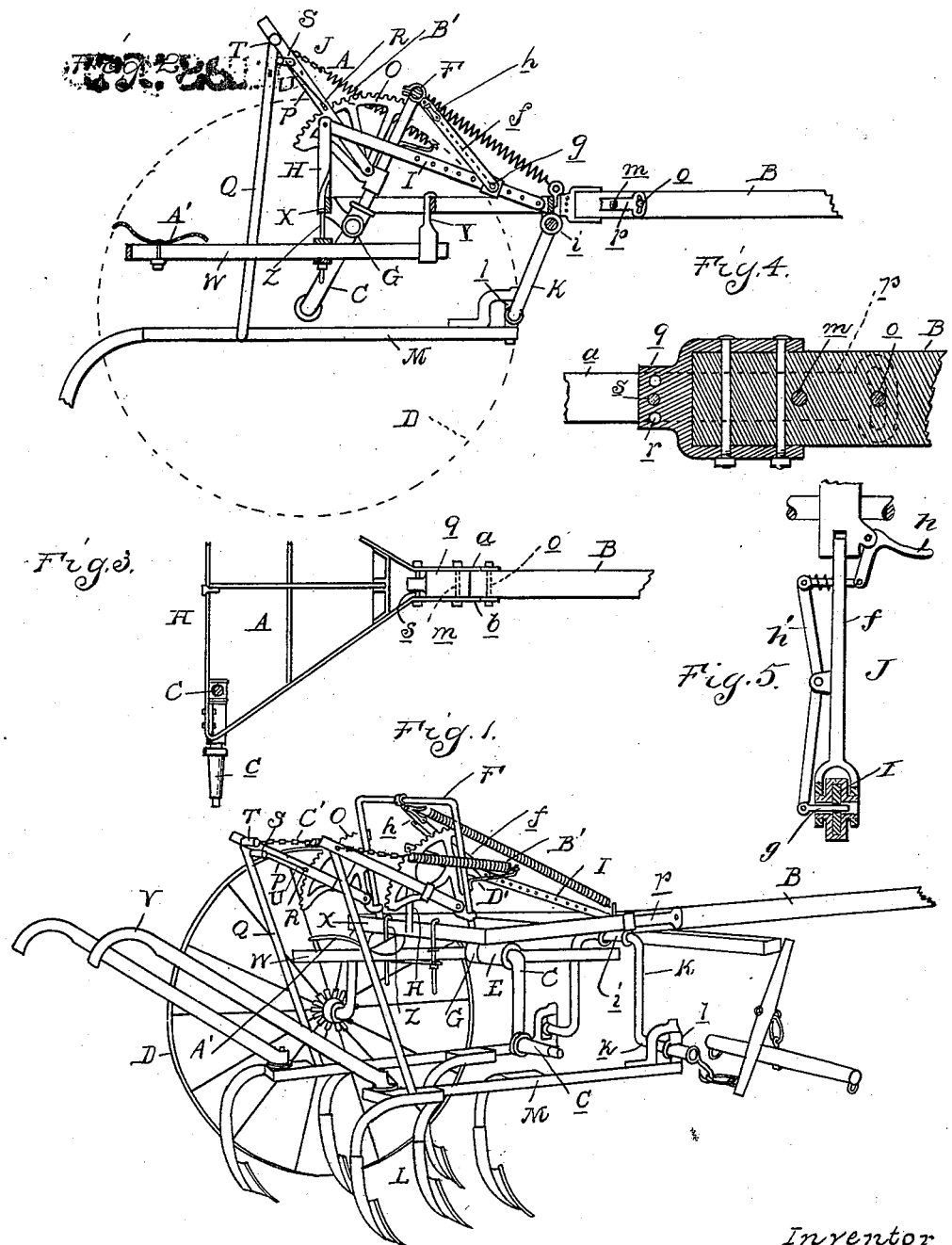

ORRIN R. BALDWIN, OF DETROIT, MICHIGAN.

CULTIVATOR.

SPECIFICATION forming part of Letters Patent No. 698,783, dated April 29, 1902.

Application filed February 25, 1901. Serial No. 48,838. (No model.)

*To all whom it may concern:*

Be it known that I, ORRIN R. BALDWIN, a citizen of the United States, residing at Detroit, in the county of Wayne and State of Michigan, have invented certain new and useful Improvements in Cultivators, of which the following is a specification, reference being had therein to the accompanying drawings.

The invention has particular reference to sulky-cultivators of that class wherein the main or supporting frame is normally in a state of balance; and the invention consists in so constructing a cultivator of this type that the equilibrium of the frame will be maintained during the raising of the plows for various purposes from the ground.

The invention further consists in the means employed for connecting the draft-bar to the supporting-frame, whereby the former may be adjusted to vary the depth of the cut; and the invention still further consists in other details of construction, as will be more fully hereinafter described, and shown in the drawings, in which—

Figure 1 is a perspective view of a cultivator embodying the invention. Fig. 2 is a vertical central longitudinal section therethrough. Fig. 3 is a plan view of the frame. Fig. 4 is a detached sectional view of the connecting means for the pole or draft-bar. Fig. 5 is a sectional elevation of the operating-lever, showing the locking mechanism therefor.

The reference-letter A designates the cultivator-frame, which is preferably triangular in configuration, the apex of which is open, as shown, the sides terminating in separated parallel members $a$ and $b$, Fig. 3, between which is adjustably secured in the manner hereinafter set forth the pole or draft-bar B.

C designates the axles, preferably arched in configuration, the lower horizontal members $c$ forming the axle proper, upon which are arranged the supporting-wheels D, and the upper oppositely-turned members extending within and projecting beyond tubular bearings E upon the frame.

F designates an operating-lever for shifting the frame forwardly or to the rear of the wheels, said lever being arched and having its ends provided with socket-pieces G, which receive the inner ends of the axles C and are fixedly secured thereto in any suitable manner.

H is an upright upon the rear of the supporting-frame, and I is an apertured bar secured to the upright at one end, as shown, and having its opposite end secured to the supporting-frame at its apex.

J designates a locking mechanism of usual construction for holding the operating-lever in its different positions of adjustment. The locking mechanism consists of the usual link $f$, bolt $g$, adapted to extend within the apertures in the bar I, and handpiece $h$, controlling the bolt $g$ through the medium of a suitable spring-pressed lever $h'$. The locking mechanism may be of any ordinary construction, and as it forms no part of the present invention is only generally described.

Pivotally mounted within bearings $i$ in the forward portion of the frame is an inverted-U-shaped bar K, the lower ends of which terminate in oppositely-extending lateral members $k$.

L designates the plow-sections, each provided with a plow-beam M, forked or bifurcated at its forward end and carrying between the furcations a tubular bearing $l$, which receives the lateral portions of the U-shaped frame K.

Connected in any suitable manner to the side portion of the arched handle or lever F are the gear-segments O.

P designates hand-standards pivoted to the lower portion of the segments, and Q designates links connecting the standards to the plow-sections.

R designates the usual latches, which engage the gear-segments, and S designates the levers controlling the latches, arranged in proximity to the handles T upon the standard and connected to the latches by links U.

V designates the usual plow-handles, connected in any suitable manner to the plow-sections, so that the cultivator may be used as a hand-cultivator, if desired.

W is a seat-bar connected to a cross or brace member X upon the frame by means of suitable hangers Y and having its rear end supported by means of hangers Z, which engage the base-section of the triangular frame.

A' is the usual seat, adjustably secured upon the seat-bar.

In practice the main or supporting frame is evenly balanced by a suitable adjustment of the operating-lever F, the latter being moved forward or rearwardly to shift the fulcrum of the frame. When it is desired to elevate the plows from the ground for the purpose of turning the machine around or for other reasons, the lever F is moved forwardly by the operator the required distance. Heretofore the additional weight and resistance offered by the plows in raising the same have destroyed the equilibrium of the frame. By the use of the mechanism shown and described it will be observed that simultaneously with the lifting of the plows the frame is shifted forwardly of the wheels and the position of the frame-fulcrum changed, so that an additional weight is thrown upon the forward end of the frame sufficient to compensate for the weight and resistance offered by the plows. Thus during the raising of the plow-section the equilibrium of the frame is maintained. When it is simply desired to slightly vary the depth of the cut, the proper adjustment is effected by operating the hand-standards, raising or lowering the latter, and locking the same by the mechanism described in their adjusted positions.

To more readily enable the operator to actuate the hand-standards, suitable springs B' are employed to compensate for the weight of the plows, the springs being connected to the standards by chains C' and to arms D' on the operating-lever F.

In cases where it is desired to raise and lower the entire plow-section the proper adjustment is effected by means of the draft bar or pole. This is so connected to the supporting-frame that it may be tilted upwardly or downwardly upon its pivot, so as to raise or lower the entire forward end of the machine.

The adjusting mechanism for the pole is of the following construction: m designates a central bolt extending through the members a b of the frame and through the tongue and forms the pivot upon which the pole turns. o designates a similar bolt extending through slotted plates p at the ends of the side members and through the pole adjacent to the bolt m, as indicated in Fig. 3. A vertical plate q is secured upon the inner end of the tongue and bolted to the latter, as shown. This plate is provided with a series of horizontal apertures r, through one of which and the side members a b a third bolt s extends. When it is desired to depress the forward end of the frame, the bolt o is loosened and the tongue moved upwardly until the upper aperture in the plate q is in alinement with the opening in the frame members for the bolt s. The latter is then inserted in place, the bolt o tightened to lock the pole, and the machine is in readiness for use. The horizontal position of the frame or the raised position of the latter is obtained in a similar manner, and accordingly the plow-sections can be raised or lowered to vary the depth of the cut as may be desired.

It will be observed from the construction of the cultivator as set forth that the upwardly extending or arched axles constitute an arched frame, upon which the rear portion of the supporting-frame of the cultivator rests; also, that a similar arched frame is provided for the forward portion of the main frame, the latter arched frame being the arch connection K. This, as described, is pivoted to the main frame and to the plow-beams and moves upon the adjustment of the frame to vary the fulcrum in unison with the arched axles. By this construction it will be seen that both the rear and forward portions of the main frame are supported, which produces the more rigid construction of cultivator and one that is more readily handled and adjusted by the operator.

While a preferable type of operating-lever for shifting the frame has been shown and described and particular means for securing the same to the axles, it will be obvious that the frame-fulcrum may be shifted for the purpose of maintaining the equilibrium of the frame by other mechanism. Therefore it is not desired to be limited to the particular devices shown, as the invention consists, essentially, in any means for varying the frame-fulcrum simultaneously with the raising of the plows for the purpose of maintaining the balance of the frame.

What I claim as my invention is—

1. In a cultivator, the combination of the main frame, rocking supports therefor at the rear and forward portions thereof respectively, and means for simultaneously rocking said supports to vary the position of the frame-fulcrum.

2. In a cultivator, the combination with the main frame, of the arched axles pivoted to the rear thereof, the plows and the beams therefor, a rocking support for the forward frame and extending from the latter to the plow-beams and movable in unison with the arched axles, and means for shifting the frame.

3. In a cultivator, the combination with the main frame, of the arched axles pivoted to the rear thereof, the plows and plow-beams, an arched supporting-frame pivoted to the forward frame end and to the forward ends of the beams, and means for rocking the axles and arched frame simultaneously.

4. In a cultivator, the combination with the frame, of the wheeled axles pivoted thereto, an arched lever fixedly secured to the axles, means for locking said lever in different positions of adjustment, the plows, and connections between said plows and the lever.

5. In a cultivator, the combination with the frame, of the wheeled axles pivoted thereto, an arched lever fixedly secured at its ends to the axles, gear-segments secured to said lever, latches carried by the standards adapted to engage the segments, the plows, and links connecting the plows and standards.

In testimony whereof I affix my signature in presence of two witnesses.

ORRIN R. BALDWIN.

Witnesses:
L. J. WHITTEMORE,
H. C. SMITH.